2,729,625
Patented Jan. 3, 1956

2,729,625

CROSS-LINKED COPOLYMERS OF THE ESTERS OF ACRYLIC AND METHACRYLIC ACID

Melvin D. Hurwitz, Huntingdon Valley, Pa., assignor to Rohm & Haas Company, Philadelphia, Pa., a corporation of Delaware No Drawing. Application May 6, 1952, Serial No. 286,441

6 Claims. (Cl. 260—80.5)

This invention relates to thermosetting resinous surface-coatings. It relates to fluid resinous materials which are stable at ordinary room-temperatures, can be easily applied to surfaces, and are converted by heat to hard, dry, tack-free films which are extremely durable, color-fast, and resistant to solvents. It relates to liquid resinous products or solutions of resinous products which are copolymers containing three different and essential kinds of copolymerized components; namely, (a) glycidyl acrylate or methacrylate, (b) a tertiary-butyl or tertiary-amyl ester of acrylic or methacrylic acid, and (c) at least one ester which has the formula $CH_2=CR-COOR'$ in which R is a hydrogen atom or a methyl radical and R' is a primary or secondary alkyl group containing one to eighteen carbon atoms.

It is well known that surface-coatings can be prepared from polymerized esters of acrylic and methacrylic acids and that these coatings are characterized by excellent original color and freedom from discoloration. Such coatings are, however, limited in their utility because they remain thermoplastic and soluble in solvents, and in many instances are objectionably soft and tacky. It is an object of this invention to provide surface-coatings which have the same freedom from color and discoloration as the older materials but which, in addition, are much harder and are far more resistant to softening under the influence of heat and solvents.

As is shown hereinafter in greater detail, these objects are attained by applying to an object to be coated a film of the particular copolymers of this invention and then heating the film until it is dried and is converted from the thermoplastic stage to the thermoset stage. The coating is applied in the form of a liquid. Thus, it can be applied as a solution of the copolymer in a solvent or in the form of a fluid, solvent-free polymer. The former method, employing a solvent, is much more convenient and is the one ordinarily used.

The improvements effected by this invention are dependent upon the particular kinds of monomeric materials which are copolymerized and upon the relative amounts of each component in the copolymer. All of the products involved herein contain at least one of each of the three different essential kinds of components described above. When one of each of the three kinds of component is employed, the products are properly called terpolymers; but it is also within the scope of this invention to copolymerize more than one of each kind of component.

The tertiary-alkyl esters which are involved herein are tert.-butyl acrylate, tert.-butyl methacrylate, tert.-amyl acrylate and tert.-amyl methacrylate. While these four esters are equivalents in this invention, they are not equivalents of the other non-tertiary-alkyl esters such as n-butyl acrylate or sec.-amyl methacrylate because they do not function herein in the same way as the latter. Actually, these four tertiary-alkyl esters give every evidence of serving as latent acids during the time when the film of polymer is heated and is converted to the thermoset stage; and, if one of them is not included in the copolymer, the two-component product does not possess the properties of the products of this invention.

The second component is glycidyl acrylate and/or glycidyl methacrylate. Without this component a copolymer of the other two components does not become hard or thermoset.

The third component which is always present in greatly preponderant amounts is an ester having the general formula $CH_2=CRCOOR'$. When, as described above, R represents a hydrogen atom, the esters are those of acrylic acid whereas, when R stands for the methyl radical, the esters are those of methacrylic acid. The character R' represents a primary alkyl group or a secondary alkyl group—not a tertiary alkyl group. And these R'-groups contain one to eighteen carbon atoms. Thus, R' represents a non-tertiary alkyl group typified by the following: Methyl, ethyl, propyl, n-butyl, sec.-butyl, n-amyl, sec.-amyl, cyclohexyl, 2-ethylhexyl, n-octyl, iso-octyl, lauryl, n-octadecyl, or sec.-octadecyl radicals.

Although it is preferred to use either glycidyl acrylate or glycidyl methacrylate individually, a mixture of the two can be used since they both exert the same effect on the properties of the final polymer. In like manner, while it is preferred to employ a single tertiary-butyl or tertiary-amyl acrylate or methacrylate, here again any mixture of the four can be used.

The amounts of the non-tertiary-alkyl esters of acrylic or methacrylic acids which are employed in making the products of this invention are from 70 to 90 mol percent—and preferably from 80 to 90 mol percent. Raising the amount above 90 mol percent results in products which are not significantly better in commercial use than unmodified polymers of the same esters. Lowering the amount below 70 mol percent requires unnecessarily large amounts of the costlier glycidyl esters. The acrylic acid esters are softer than the corresponding esters of methacrylic acid and consequently a larger amount of the glycidyl esters and the tertiary-alkyl esters is ordinarily used with the former than with the latter.

It follows that the amounts of the tertiary-alkyl esters and the glycidyl esters must total 10 to 30 mol percent. For best results these two components are employed in substantially equimolar amounts. Thus, in the preferred embodiment of this invention, substantially the same amount of the tertiary-alkyl esters and the glycidyl esters, on a molar basis, within the limits of 5 to 15 mol percent—or better yet within the limits of 5 to 10 mol percent—is used. An excess of either over equimolar amounts can be tolerated but apparently no advantage is gained. Thus, for example, 5 mol percent of the glycidyl ester and 15 mol percent of the tertiary-alkyl ester—or vice versa—is operable; but in no case should the amount of either fall below 5 mol percent or exceed 15 mol percent. Less of these two kinds of components is required in copolymers with the lower alkyl esters of acrylic or methacrylic acids than with the higher alkyl esters because the polymers of the lower alkyl esters (wherein R' is an n-butyl group, for example) are much harder themselves than the higher alkyl esters (wherein R' is, for example, an octadecyl group). Therefore, as the number of carbon atoms in the alkyl group, R', of the non-tertiary alkyl ester increases, it is necessary that the amounts of the glycidyl esters and the tertiary-alkyl esters be raised within the limits set forth above in order to insure a film which is hard and tack-free.

Although this invention is directed to improved products which are based on the three essential components described above, it is nevertheless true that small amounts of other vinyl compounds such as styrene, acrylonitrile, vinyl formal or vinyl acetate can be included in the monomeric mixture which is polymerized. These components, except when present in very small amounts, do naturally exert their own influence on the physical properties of the final product and give rise to materials having different characteristics.

The products of this invention are preferably polymerized in solution. For this purpose any inert liquid which is a solvent for the monomeric mixture and the final copolymer is employed. By "inert," of course, is meant a liquid which does not undergo a chemical change during the polymerization of the monomeric mixture. Examples of solvents which have been used in the polymerization of various monomeric mixtures include halogenated hydrocarbons such as carbon tetrachloride, ethylene dichloride, perchloroethylene; hydrocarbons such as toluene and xylene; and esters such as Cellosolve acetate. One advantage of employing a solvent is that the polymerization can be easily controlled. Another is that the materials are always fluid and the product—a solution—is ready for use and requires nothing more than dilution.

A less satisfactory procedure is to polymerize the mixtures in the absence of solvent and then dissolve the product in a solvent. In some applications the solvent-free copolymer which is polymerized to the syrupy stage is used directly.

The mixtures of monomers can be polymerized at low temperatures under the influence of ultraviolet light and an activator such as benzoin but it is much more practical to carry out the polymerization at elevated temperatures in the presence of a free radical catalyst. Temperatures up to 130° C. are suitable. It is especially convenient to carry out the polymerization at the refluxing temperature of the mixture provided it is not above 130° C.

The kinds and amounts of catalysts which are employed are the same as those which are customarily used in the polymerization of compounds containing the vinylidene group, $CH_2=C<$. These catalysts are exemplified by the following which provide free radicals and which are used in an amount from 0.01% to 5%, and preferably from 0.02% to 1%, of the weight of the copolymerizable compounds: Benzoyl peroxide, acetyl peroxide, lauroyl peroxide, succinyl peroxide, benzoyl acetyl peroxide, tert.-butyl hydroperoxide, di-tert.-butyl peroxide, tert.-butyl perbenzoate, stearoyl peroxide, ascaridol, cumene hydroperoxide, caprylyl peroxide, and the like.

It is within the scope of this invention to include dyes, pigments, and extenders in the surface-coating products of this invention. While these can be added to the monomeric mixture prior to polymerization, it is preferred to add them, as, for example, by milling or grinding, to the fluid copolymers.

The solution of the copolymer, pigmented or unpigmented, is applied to the surface to be finished by conventional means such as rolling, brushing, spraying, or dipping. The surface-coating is then heated, for example, by baking or by exposure to infra-red radiation. The heating operation is necessary in order that the copolymer change from a thermoplastic material to a thermoset one. A chemical change in the film definitely takes place during the heating period and the film gradually acquires hardness and resistance to solvents. A temperature above 135° C., and preferably above 160° C., is employed. The uppermost temperature is, of course, just short of the depolymerization point of the polymer but an upper limit of 200° C. is recommended as practical. The required time of heating is inversely proportional to the temperature. Extending the time of heating beyond the point where the film has become thermoset has no advantage. Nor does it have any particular disadvantage since the products of this invention have excellent color-retention under all reasonable conditions of temperature.

The copolymers which are the subject of this invention are not only suitable for the coating of metals and rigid articles in general but they are unusually good for the coating of paper and textiles. They provide very durable, flexible, tough, grease-proof coatings for all kinds of paper, and they form the same kind of coatings on textiles. Two of the most valuable uses of the products are in the preparation of lusterless, pigmented coatings for military equipment and as clear, colorless coatings over polished metals such as brass and chromium.

The following examples serve to illustrate how the thermosetting surface-coating compositions of this invention are made and used.

In the tabulations below the following abbreviations are used: GMA for glycidyl methacrylate; TBA for tert.-butyl acrylate; TBMA for tert.-butyl methacrylate; MMA for methyl methacrylate; EA for ethyl acrylate; and BA for n-butyl acrylate.

EXAMPLE 1

Various solutions of monomeric materials were made which had the compositions shown in Table 1 below. The amounts of the individual monomers are given in mole percent. The solutions in all cases contained 40% of the monomers and 60% of ethylene dichloride. In addition, 1% of benzoyl peroxide, based on weight of the monomers, was employed as a catalyst throughout. Each solution was charged to a reactor equipped with mechanical stirrer, thermometer, and reflux condenser. One-third of the amount of benzoyl peroxide was added and each mixture was stirred, heated to refluxing temperature, and held there for a total of six hours during which time the other two-thirds of the catalyst was added in equal portions at the end of the second and of the fourth hour. In every case the product was a clear, colorless, resinous solution. Glass panels were coated with the solutions at a wet-thickness of 3 mils and some were air-dried overnight while others were baked for one-half hour at 175° C. The films were tested for pencil-hardness and for resistance to solvents. The latter test consisted of rubbing the dried films of resin with a pad saturated with acetone and recording the number of strokes required to destroy the film of resin. The hardness of the air-dried and baked films and the solvent-resistance of the latter are tabulated. In all cases the air-dried films were removed in fewer than five strokes.

*Table 1*

| Run | MMA | GMA | TBA | Air-Dried Film | Hardness of Baked Film | Solvent-Resistance |
|---|---|---|---|---|---|---|
| 1a | 80 | 10 | 10 | 7H | 9H | >200 |
| 1b | 90 | 10 | | 8H | 9H | 30 |
| 1c | 90 | | 10 | 9H | 9H | 10 |

EXAMPLE 2

Forty percent solutions in toluene of the mixtures of monomers shown in Table 2 were made and then polymerized in the presence of 1% benzoyl peroxide and finally tested as outlined in Example 1 above. The pertinent data are here-tabulated:

*Table 2*

| Run | BA | GMA | TBMA | Air-Dried Film | Baked Film | Solvent-Resistance |
|---|---|---|---|---|---|---|
| 2a | 85 | 10 | 5 | Tacky | Tack-free | >200 |
| 2b | 90 | 10 | | do | Slightly tacky | 30 |
| 2c | 95 | | 5 | do | do | 20 |
| 2d | 90 | | 10 | do | do | 30 |

EXAMPLE 3

Forty percent solutions in ethylene dichloride were prepared, polymerized, and tested in the same manner as is described in Example 1 above. The pertinent data are here-tabulated:

Table 3

| Run | MMA | EA | GMA | TBA | Air-Dried Film | Hardness of Baked Film | Solvent-Resistance |
|---|---|---|---|---|---|---|---|
| 3a | 35 | 35 | 10 | 20 | H | 5H | >200 |
| 3b | 45 | 45 | 10 | | H | 2H | 30 |
| 3c | 40 | 40 | | 20 | H | 2H | 30 |
| 3d | 45 | 45 | | 10 | H | 2H | 20 |

I claim:

1. A thermoplastic copolymer which is capable of converting to a thermoset product when it is heated above about 135° C. and which is the copolymerized product of a mixture of the three essential components: (a) from 5 to 15 molar percent of an ester from the class consisting of tert.-butyl acrylate, tert.-butyl methacrylate, tert.-amyl acrylate, and tert.-amyl methacrylate, (b) from 5 to 15 molar percent of an ester from the class consisting of glycidyl acrylate and glycidyl methacrylate, and (c) from 70 to 90 molar percent of at least one ester having the general formula $CH_2=CRCOOR'$ in which R represents a member of the class consisting of a hydrogen atom and the methyl radical and R' is a non-tertiary alkyl radical containing one to eighteen carbon atoms.

2. A thermoplastic copolymer which is capable of converting to a thermostat product when it is heated above about 160° C. and which is the copolymerized product of a mixture of the three essential components: (a) from 5 to 15 molar percent of tert.-butyl acrylate, (b) from 5 to 15 molar percent of glycidyl methacrylate, and (c) from 70 to 90 molar percent of methyl methacrylate.

3. A thermoplastic copolymer which is capable of converting to a thermostat product when it is heated above about 160° C. and which is the copolymerized product of a mixture of the three essential components: (a) from 5 to 15 molar percent of tert.-butyl acrylate, (b) from 5 to 15 molar percent of glycidyl methacrylate, and (c) from 70 to 90 molar percent of a mixture of ethyl acrylate and methyl methacrylate.

4. A thermoplastic copolymer which is capable of converting to a thermostat product when it is heated above about 160° C. and which is the copolymerized product of a mixture of the three essential components: (a) from 5 to 15 molar percent of tert.-butyl acrylate, (b) from 5 to 15 molar percent of glycidyl methacrylate, and (c) from 70 to 90 molar percent of n-butyl acrylate.

5. A thermoplastic copolymer which is capable of converting to a thermoset product when it is heated above about 160° C. and which is the copolymerized product of a mixture of the three essential components: (a) from 5 to 15 molar percent of tert.-butyl acrylate, (b) from 5 to 15 molar percent of glycidyl methacrylate, and (c) from 70 to 90 molar percent of lauryl methacrylate.

6. A thermoplastic copolymer which is capable of converting to a thermoset product when it is heated above about 160° C. and which is the copolymerized product of a mixture of the three essential components: (a) from 5 to 15 molar percent of tert.-butyl acrylate, (b) from 5 to 15 molar percent of glycidyl methacrylate, and (c) from 70 to 90 molar percent of ethyl acrylate.

References Cited in the file of this patent
UNITED STATES PATENTS
2,580,901    Erickson et al. _____ Jan. 1, 1952